United States Patent [19]

Dobashi

[11] Patent Number: 5,659,825

[45] Date of Patent: Aug. 19, 1997

[54] CAMERA BODY

[75] Inventor: Toshio Dobashi, Yokohama, Japan

[73] Assignee: Nikon Corporation, Tokyo, Japan

[21] Appl. No.: 162,403

[22] Filed: Dec. 6, 1993

[30] Foreign Application Priority Data

Dec. 4, 1992 [JP] Japan ................... 4-083717 U
Dec. 4, 1992 [JP] Japan ................... 4-083718 U
Dec. 4, 1992 [JP] Japan ................... 4-083719 U

[51] Int. Cl.$^6$ ................................. G03B 19/12
[52] U.S. Cl. ................. 396/357; 396/358; 396/535
[58] Field of Search ....................... 354/152, 154, 354/288; 396/535, 538, 539, 541, 354, 357, 358

[56] References Cited

U.S. PATENT DOCUMENTS 4,067,032  1/1978  Yoshikawa et al. .............. 354/288
4,103,311  7/1978  Horigome ....................... 354/152
4,344,685  8/1982  Milatz et al. ................... 354/288

*Primary Examiner*—David M. Gray

[57] ABSTRACT

A camera body adapted for use in a single lens reflex (SLR) camera which has a mirror box associated therewith and a mount to removably mount and slidably adjust the placement of the mirror box. The mount allows the mirror box to be slid in a plane which is substantially perpendicular to the optical axis of a photographic lens and the light received thereby. Additionally, a camera body includes a front portion having a mount to affix a photographic lens, and a rear portion having a rail system for allowing a photosensitive film to travel within the rail system. The front portion and the rear portion are integrally formed. Finally, a camera body includes an aperture and related shutter insertion and removal mechanism for allowing easy access to a shutter mechanism of a camera without having to disassemble the camera.

5 Claims, 5 Drawing Sheets

CAMERA BODY

BACKGROUND OF THE INVENTION

1. Field of the Invention

The present invention relates to body structures for single lens reflex (SLR) cameras.

2. Description of the Related Art

It is well known that the structure of single lens reflex cameras is such that to observe a photographic image which has been imaged on a viewfinder image plane, the position of the viewfinder image plane must be adjusted to be in conjugate relation to a film surface. For this purpose, prior art single lens reflex cameras used screws to adjustably and fixedly mount a member which included a viewfinder screen to the body of the camera. A floating or adjustable setting was achieved by means of springs and the like which were set in place by screws. In this way, the screws were manipulated to adjust the amount of compression relative to the body, so as to adjust the position of the viewfinder screen.

The above-mentioned camera bodies, however, required difficult adjustment procedures and apparatuses which were costly to manufacture and difficult to use. Such deficiencies of the prior art are solved by the present invention.

In addition to the problems associated with providing a viewfinder imaging plane that is mounted on a camera body in such a manner that the viewfinder image plane is in conjugate relation to a film surface, there are other problems associated with a camera body having multiple parts.

Such other problems are illustrated in FIG. 5, wherein a camera body is shown as being comprised of at least two parts (i.e., a front part and rear part which are not formed together).

Typically, such multi-part camera bodies are configured so that the shutter 106 is mounted on the rear body 103, and a mirror box (not shown in the drawing) is mounted on the front body 104. Next, the front body 104 is affixed to a mounting surface 103a of the rear body 103, and furthermore a mount 105 is affixed to the front body 104.

The surface of the mount 105 (right-hand lower side of FIG. 5) consists of a standard surface for the installation of a photographic lens. Moreover, a rail surface or system 108 for the travel of the photographic film is arranged on the back surface (left-hand upper side of FIG. 5) of the rear body 103. The front body 104 is interposed between mount 105 and the rear body 103.

Referring now to FIG. 6, therein depicted is a cross section of the front body 104 in the mounted state on the mounting surface 103a of the rear body 103. Between the mounting surface 103a and the mounting surface of the front body 104, a gap normally results because shaping and forming of the front and rear halves of the body is difficult and not exact. In such a state, when screw 107 is tightened, the gap between the mounting surface 103a and the mounting surface of the front body 104 is small, and deformation as shown in FIG. 6 arises, with the result that the front body 104 deforms. Due to the deformation of the front body 104, a change of the position of the mount surface of the front body 104 results.

As such, due to the tightening intensity of screw 107, there is a change in the distance between the mount surface and the rail surface on which the photographic film travels. Accordingly, after repairs and the like, in the case in which the rear body 103 and the front body 104 are mounted and reassembled together, it becomes necessary to readjust the distance between the mount surface and the rail surface on which the photographic film travels. Plastic, multi-part camera bodies are even more susceptible to the problems addressed here.

Even if changes are made to the assembly of the photographic lens and the body, it is normally necessary, so as to be able to focus accurately on the photographic film surface, to fix the distance between the mount surface and the rail surface on which the photographic film travels. As such, it is also necessary for the scatter of the distance between the mount surface and rail surface to be small.

Accordingly, because the front body 104 is interposed between mount 105 and rear body 103, a problem arises in that the distance between the mount surface and the rail surface on which the photographic film travels is not constant and is often large. More particularly, the problem mentioned here is due to the interposition of the front body 104, the dimensional scatter of the front body 104, and the deformation of the front body 104 when the front body 104 is mounted to the rear body 103. The problem of proper alignment and adjustment of camera body portions to produce dimensional accuracy by adjustments and the like are necessary in the manufacturing process of such multi-part camera bodies so that the distance between the mount surface and the film surface are made constant. Moreover, the problems addressed here are compounded in situations where repairs and the like necessitate separation and reassembly of the rear body 103 and the front body 104. In particular, repairs and the like often required operations that call for high accuracy settings similar to those done during original manufacture in order to provide dimensional accuracy so that the distance between the mount surface and the rail surface is kept constant.

The above-mentioned problems associated with multipart bodies are solved by the present invention.

The final problem associated with prior art multi-part camera bodies which is addressed and solved by the present invention, is also illustrated by FIG. 5.

In FIG. 5, after the shutter 106 is inserted into the rear body 103, a front body 104 with an integral mirror box is affixed thereto. The front body 104 is affixed to the mounting surfaces 103a of the rear body 103. Moreover, a mount 105 is affixed to the front body 104. As such, after shutter 106 is inserted into the rear body 103, the front body 104 is affixed to the rear body 103 thereby making access to shutter 106 difficult. As such, the typical camera body structure as depicted in FIG. 5 indicates that when shutter 106 has to be changed or removed, because of breakdowns and the like, such operation could not be carried out without separating the rear body 103 and front body 104.

The present invention solves the shutter access problems associated with multi-part, prior art camera bodies mentioned above.

SUMMARY OF THE INVENTION

It is an object of the present invention to solve the above-mentioned problems.

It is another object of the present invention to allow for the adjustment of a camera's mirror box so that a viewfinder image plane can be arranged to be in conjugate relation to a film surface.

It is another object of the present invention to provide a camera body having a mirror box mount which allows for slidable mounting of a mirror box and which does not require complex screw and spring configurations.

It is still another object of the present invention to provide a camera body having a mirror box mount which can be produced at low cost.

It is another object of the present invention to provide a camera body wherein the distance between a lens mount and a film rail system or surface on which a photographic film travels remains constant and/or fixed.

It is yet another object of the present invention to provide a camera body that is formed to have a single-piece construction.

It is yet another object of the present invention to allow for the easy insertion, removal, and mounting of a shutter member or mechanism or other camera componentry within a camera body without having to disassemble the camera body.

These and other objects are achieved by the present invention by providing a camera body adapted to be used with a single lens reflex (SLR) camera which includes a mount for slidably and fixedly mounting a mirror box of the single lens reflex camera. The mount allows the mirror box to slide in the mount relative to the camera body and in a plane which is substantially perpendicular to the optical axis of a photographic lens of the single lens reflex camera.

Additionally, the present invention provides a camera body adapted for use in a single lens reflex (SLR) camera which includes a front portion having a mount to affix a photographic lens, and a rear portion having a rail system for allowing a photosensitive film to travel within the rail system. The front portion and the rear portion are integrally formed.

Also, the present invention provides a camera body adapted for use in a single lens reflex (SLR) camera which includes an aperture for inserting and removing a mountable shutter mechanism.

Finally, the present invention provides a camera body which is adapted to be used in a single lens reflex (SLR) camera. The camera body includes a single-piece shell having an aperture formed therein for inserting and removing camera componentry. Also, the camera body includes a mount disposed on the single-piece shell for allowing camera componentry to be slidably and fixedly mounted on the camera body.

The following sections will illustrate the features and advantages of the present invention and the ways in which the aforementioned objects are achieved.

BRIEF DESCRIPTION OF THE DRAWINGS

The above-mentioned and other objects and advantages of the present invention will become apparent and more readily appreciated from the following description of the preferred embodiments, taken in conjunction with the accompanying drawings, of which.

DETAILED DESCRIPTION OF THE PREFERRED EMBODIMENTS

Figure 1:
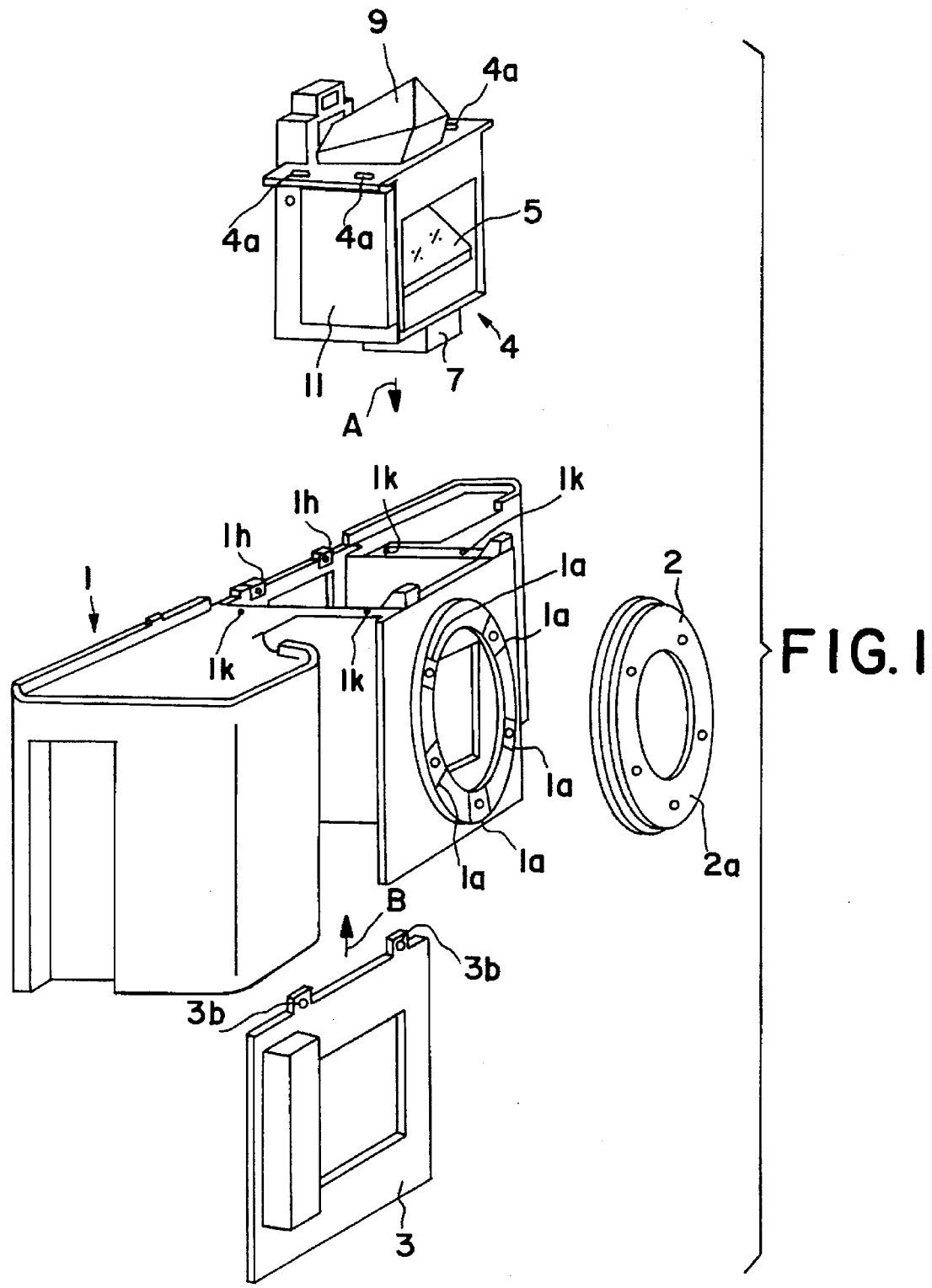
FIG. 1 is a diagram which depicts an oblique, exploded view of a camera body structure of a single lens reflex camera according to an embodiment of the present invention.

The present invention is described with reference to drawing FIGS. 1–4 which were briefly described above and which are now referred to in order to provide a detailed description of the preferred embodiments. Like parts will be identified with like reference numerals and/or labels.

Figure 2A:
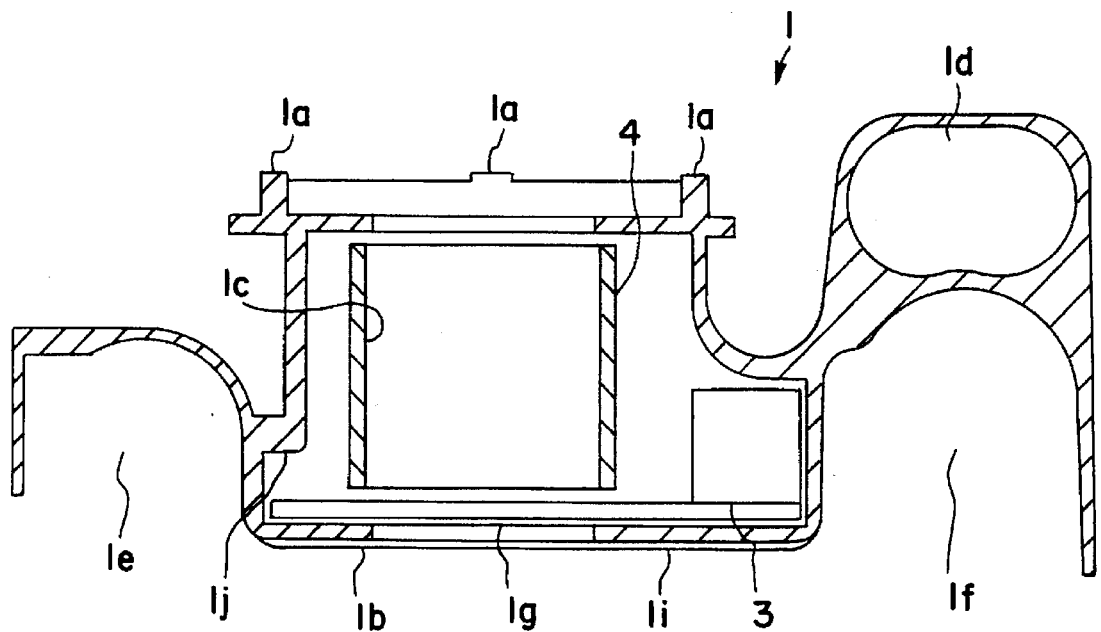
FIGS. 2(a) and 2(b) are diagrams which depict, respectively, a horizontal cross-sectional view and a bottom surface view of the camera body shown in FIG. 1.
Figure 2B:
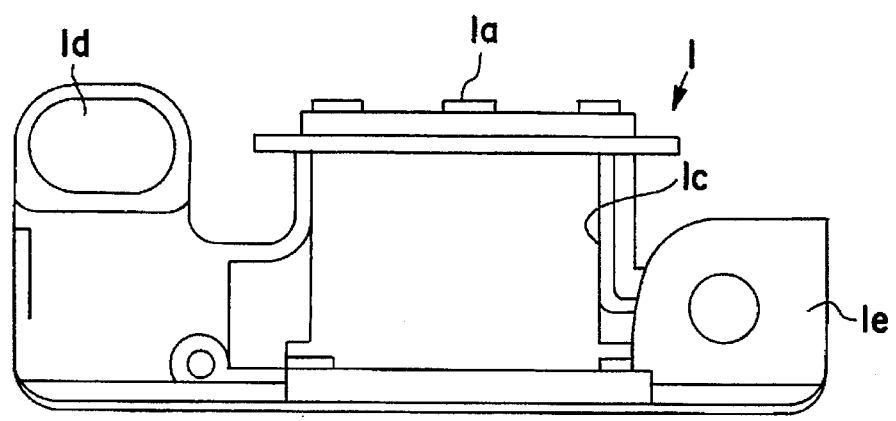
Figure 3:
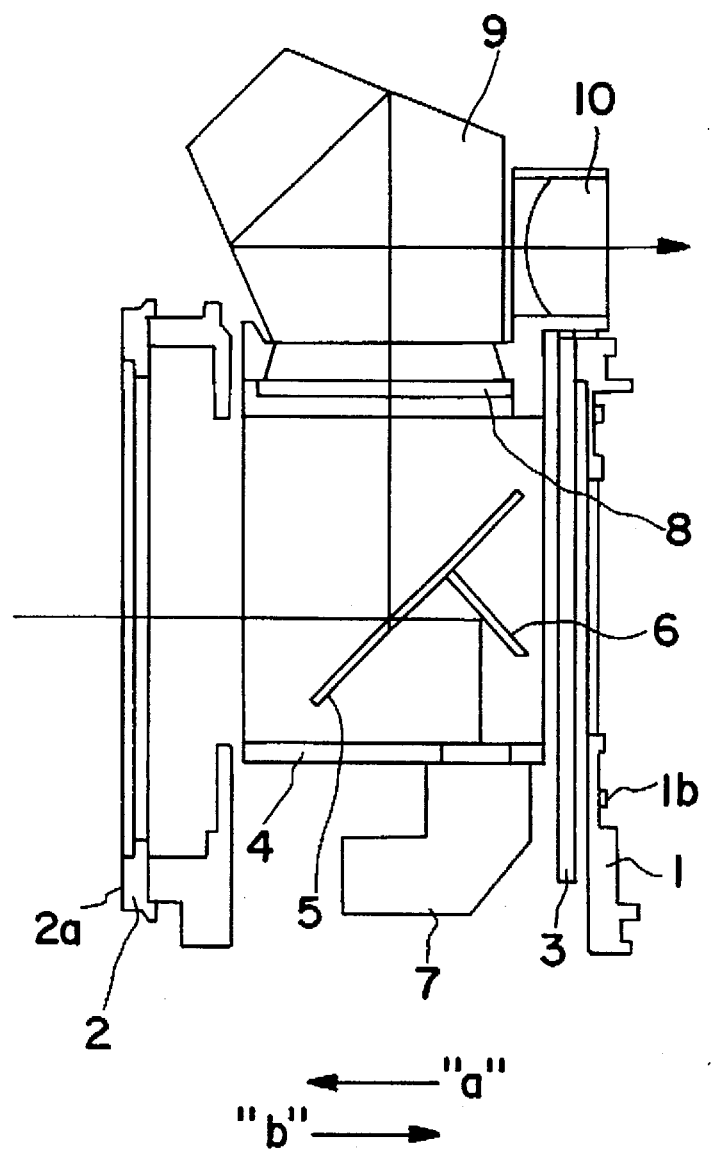
FIG. 3 is a diagram which depicts a vertical cross section of the camera body shown in FIG. 1.

Referring now to FIGS. 1–3 therein depicted respectively are (1) an oblique, exploded view of a camera body structure of a single lens reflex camera according to an embodiment of the present invention, (2) a horizontal cross section and bottom surface view of the camera body shown in FIG. 1, and (3) a vertical cross section of the camera body shown in FIG. 1.

In FIG. 1, mount 2, shutter 3, and mirror box 4 are assembled in camera body 1. Shutter 3 is inserted into body 1 from the direction of the arrow B and is fixedly mounted in body 1. Mirror box 4 is inserted into the body 1 in the direction of the arrow A and is fixedly mounted on body 1.

As seen in FIGS. 2(a) and (b), body 1 is configured to have arranged therein a mounting surface 1a to mount the mount 2, a rail surface 1b for the photographic film (not shown in the drawing) to travel, an open aperture portion 1c (see FIG. 2(b)) in order to include a shutter 3 and a mirror box 4, an open aperture portion 1d to receive an electric battery (not shown in the drawing), a cartridge compartment 1e to receive photographic film, a spool chamber 1f to wind up the photographic film, and an aperture portion 1g which is an open aperture for photographic use. In the forward direction of the aperture portion 1g (upwards in FIG. 2(a)), shutter 3 is included to control the exposure time.

Shutter 3 is mounted on a surface 1i. Furthermore, so that it becomes possible to use a type of slide which can be of a form having no slope, the configuration is such that a surface 1j is spaced apart from the surface 1i. In the mount 2 of FIG. 1, a mounting surface 2a is arranged to consist of a standard surface for installation of a photographic lens (not shown in the drawing). Such standard surfaces will be apparent to those skilled in the art. The rear surface of the mounting surface 2a is a surface for mounting objects to body 1 and will be apparent to those skilled in the art.

In the mirror box 4, as shown in FIGS. 1 and 3, there is included a main mirror 5, sub-mirror 6, distance measuring unit 7, viewfinder screen (i.e., focusing or imaging plate) 8, pentaprism 9, ocular lens 10, and shutter charge unit 11. The photographic light, reflected by the main mirror 5 to the viewfinder screen 8, is imaged on the viewfinder screen 8. By observing the image which is formed on viewfinder screen 8 through the pentaprism 9 and ocular lens 10, monitoring of the photographic light is performed.

It should be noted that some of the photographic light, that passes through the main mirror 5, is passed by the sub-mirror 6 to the distance measuring unit 7 and is used for distance measurement. Moreover, the main mirror 5 and sub-mirror 6 are moved out of the path of the photographic light when a photograph is taken.

The adjustment of the position of the viewfinder 8 relative to the body will now be described. The optical path length from the mounting surface 2a to the rail surface 1b of the body 1 is fixed at a prescribed value from the shape of the body 1 and mount 2. Accordingly, if the optical path length from the mounting surface 2a to the viewfinder screen 8 can be adjusted to be equal to the optical path length from mounting surface 2a to the rail surface 1b of the body 1, the position of the viewfinder screen 8 can be adjusted to be in a conjugate position to the film surface.

The mirror box 4 is constituted to be slidable on the mounting portion 1k formed as a portion of the body 1 (FIG. 1). Namely, mirror box 4 is caused to slide on the mounting portion 1k in the direction of the arrows "a" and b" shown in FIG. 3, and when it slides in the direction of the arrow "a," the optical path length from the mounting surface 2a to the viewfinder screen 8 becomes shorter in comparison with the optical path length from the mounting surface 2a to the rail surface 1b (FIG. 3); conversely, when mirror box 4 slides in the direction of the arrow "b," the optical path length from the mounting surface 2a to the viewfinder screen 8 becomes longer in comparison with the optical path length from the mounting surface 2a to the rail surface 1b (FIG. 3). In either event, the sliding of mirror box 4 is done relative to the camera body in a direction of photographic light. Additionally, the slidable mounting of mirror box 4 allows the viewfinder screen to be placed in conjugate relationship to a film surface.

Hence, after an adjustment so that the optical path length from the mounting surface 2a to the viewfinder screen 8 becomes equal to the optical path length from the mounting surface 2a to the rail surface 1b, to fixedly mount the mirror box 4 via slotted holes 4a, the operation of adjusting the position of the viewfinder screen 8 to a position conjugate to the film surface is completed by screw fixing or fastening mirror box 4 to portion 1k (see FIG. 1) which mounts the mirror box 4. Moreover, the adjustment of the distance measuring portion 7 is performed after the adjustment and mounting of mirror box 4.

Figure 5:
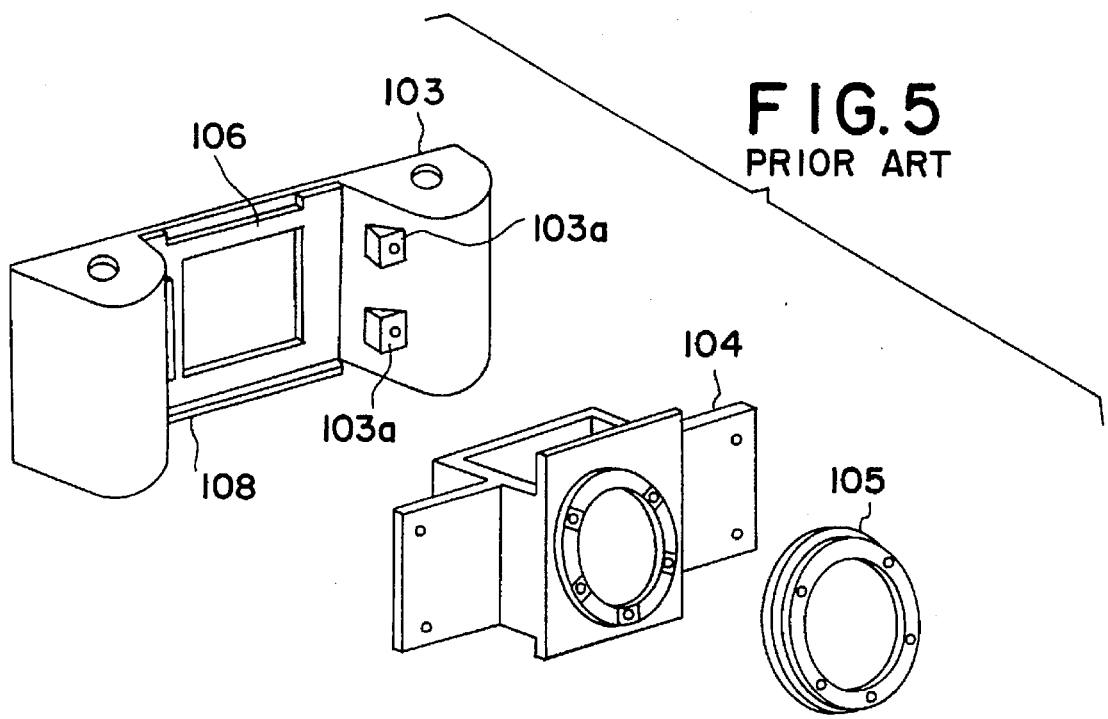
FIG. 5 is diagram which depicts an oblique, exploded view of the body structure of a single lens reflex camera according to the prior art.
Figure 6:
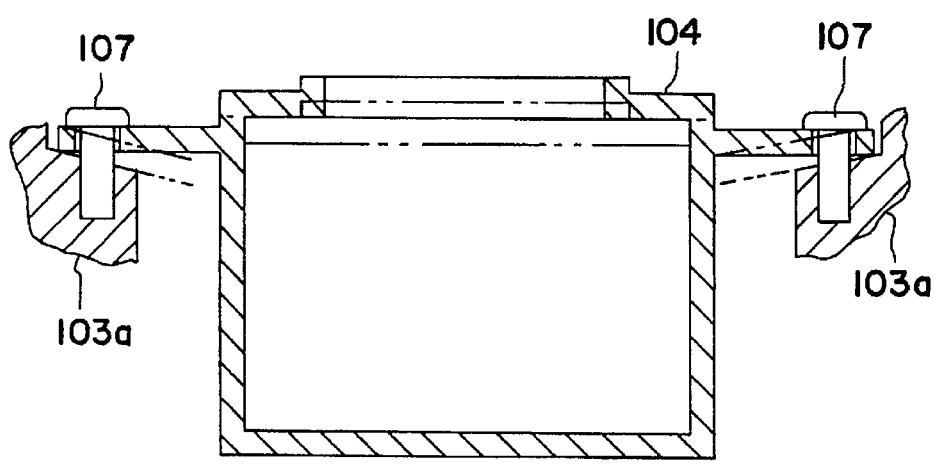
FIG. 6 is a diagram which depicts a cross section of the aperture depicted in FIG. 5.

In terms of a further aspect of the present invention, shutter 3 can be changed, removed, and/or inserted via the open aperture (see FIGS. 2 (a) and 2(b)). Moreover, it is possible to manipulate shutter 3 without separating the rear body 103 and the front body 104 for a camera body described in reference to FIGS. 5 and 6. While the aperture 1c is shown in the bottom surface of body 1 (FIG. 2 (b)), it is also possible for aperture 1c to be formed in the back surface or the top surface of the camera body of the single lens reflex camera instead of in the bottom surface. It should be understood that aperture 1c can be formed on the camera body using conventional molding or cutting techniques during the general molding or formation of a camera body.

Figure 4A:
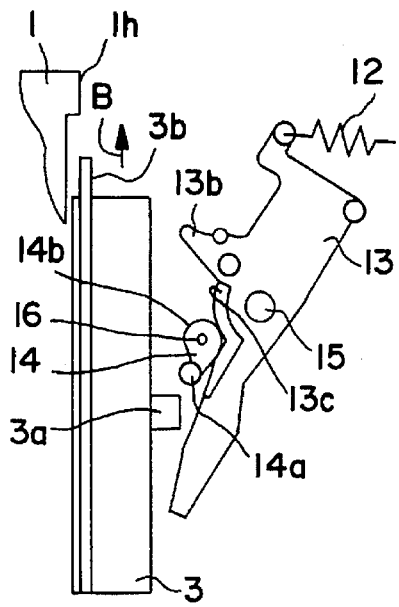
FIGS. 4(a) and (b) and (c) are diagrams which depict side views of a body structure of a single lens reflex camera according to an embodiment of the present invention.
Figure 4B:
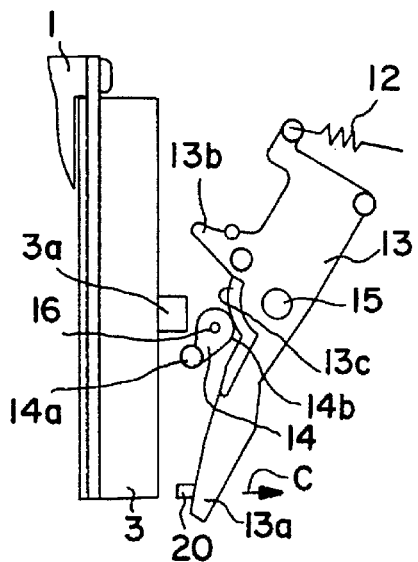

Referring now to FIGS. 4(a), (b) and (c), therein depicted are side views of a body structure of a single lens reflex camera according to an embodiment of the present invention. In particular, the camera body has been formed so that a front portion is integral with a back or rear portion, and more particularly, the camera body has a single-piece construction having an aperture and related insertion and removal mechanism for inserting and/or removing a shutter mechanism or other camera component.

FIGS. 4(a), (b and (c) illustrate shutter insertion and removal via an aperture and its related insertion and removal mechanism in a camera body. In particular, a lever 13 is pivotably mounted on a pin 15. Lever 13 is urged in a clockwise direction by means of a spring 12. A loading lever 14 is pivotably mounted on a pin 16. Lever 13 and loading lever 14 are geared together by respective gear portions 13c and 14b. Loading lever 14 is rotated by the rotation of the lever 13. The projecting portion 13b of the lever 13 connects to the main mirror 5. Mirror 5 is moved between the observation position and the removal position by the rotation of the lever 13.

The connection portion 14a of loading lever 14 and the loading portion 3a of the shutter 3 are connected at the time of camera assembly. When the loading lever 14 rotates clockwise, the loading portion 3a moves in an upward direction into a state in which the shutter is loaded (see FIG. 4(c)).

FIG. 4(a) shows the state at a time of mirror box 4 insertion when the shutter 3 is introduced into the body 1 from the lower side of the structure depicted in FIG. 4(a). Moreover, FIG. 4(a) shows the aforementioned state after the mirror box 4 (not shown in FIG. 4(a)), on which the loading lever 14 has been mounted and affixed to camera body 1. As such, loading lever 14 is rotated counterclockwise thus moving the connection portion 14a of the loading lever 14 to a position where it is disconnected from the loading portion 3a of the shutter 3. As such, insertion of shutter 3 is performed by slidably inserting the shutter 3 in the direction of the arrow B (see FIG. 4(a) and FIG. 1). In turn, the mounting portion 3b of the shutter 3 is then screwed or fastened to the mounting portion 1h of camera body 1.

After insertion of shutter 3, lever portion 13a of the lever 13 connects to a drive lever 20. The drive lever 20 drives in the direction of the arrow C in FIG. 4(b) to drive the lever 13 to rotate when the shutter 3 is loaded, the main mirror 5 moves to the observation position, and the spring 12 is placed in the loaded state (see FIG. 4(c)).

Figure 4C:
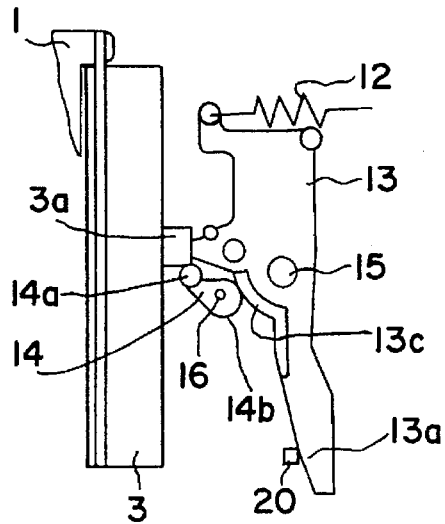

As shown in FIG. 4(c), when the drive lever 20 moves to the left, lever 13 is rotated clockwise by the spring 12. In turn, as the shutter button (not shown in the drawing) is depressed by a photographer, the shutter blind (not shown in the drawing) travels, and the shutter ultimately returns to the state shown in FIG. 4(b).

Because the camera body 1, as shown in FIGS. 1, 2(a) and 2(b), is integrally formed such that a front body has a mount affixing surface 2a in order to affix a mount for the installation of a photographic lens, and a rear body has a rail surface 1b for the travel of a photosensitive film, readjustment is rendered unnecessary, and the distance between the standard surface to install a photographic lens and the rail surface for travel of the photographic film can be constant and/or fixed, thus never needing adjustment or recalibration.

The present invention has been described hereinabove by way of example and with regard to the preferred embodiments depicted in the drawing figures. As such, it will be readily appreciated by those skilled in the art that many changes and modifications may be made in these embodiments, without departing from the principles and spirit of the present invention, the scope of which is defined in the claims and their equivalents.

What is claimed is:

1. A camera having a photographic lens with an optical axis, the camera comprising:

a mirror box having a flange on the periphery of said mirror box, the flange provided with slotted holes extending parallel to the optical axis;

a camera body having a mount for receiving said mirror box, said mount having threaded holes allowing said mirror box to be slidably adjusted along a region of said mount relative to said camera body along the optical axis of said photographic lens prior to being fixed in place within the region by screws inserted through the slotted holes in said mirror box into the threaded holes in the mount.

2. The camera body according to claim 1, further comprising:

an aperture for receiving a mountable shutter mechanism.

3. A camera comprising:

a shutter mechanism;

a mirror box;

a single piece body having a first opening to accept the mirror box, a second opening to accept the shutter mechanism in alignment with the mirror box, and a mount surface to receive a lens mount in alignment with the mirror box; and said mirror box is provided with two longitudinal flanges, each flange being provided with a slotted opening extending along each flange, said mirror box being slidably adjustable longitudinally, within the first opening by at least the length of the slots, so as to align said mirror box with said shutter mechanism and the mount surface.

4. A camera, as set forth in claim 3, wherein said mirror box is fixed within the first opening by screws extending through the slotted opening.

5. A camera, as set forth in claim 4, wherein the first opening is defined by two side walls extending between a front wall supporting the mount surface and a rear wall defining a portion of the second opening, and wherein the screws are fixed into threaded holes on the top surface of the two side walls.

* * * * *